March 30, 1926.  
W. G. COLLINS  
1,579,083  
MECHANICAL MOVEMENT  
Original Filed March 24, 1922   2 Sheets-Sheet 1

Inventor  
Walter G. Collins  
By Hazard & Miller  
Attys.

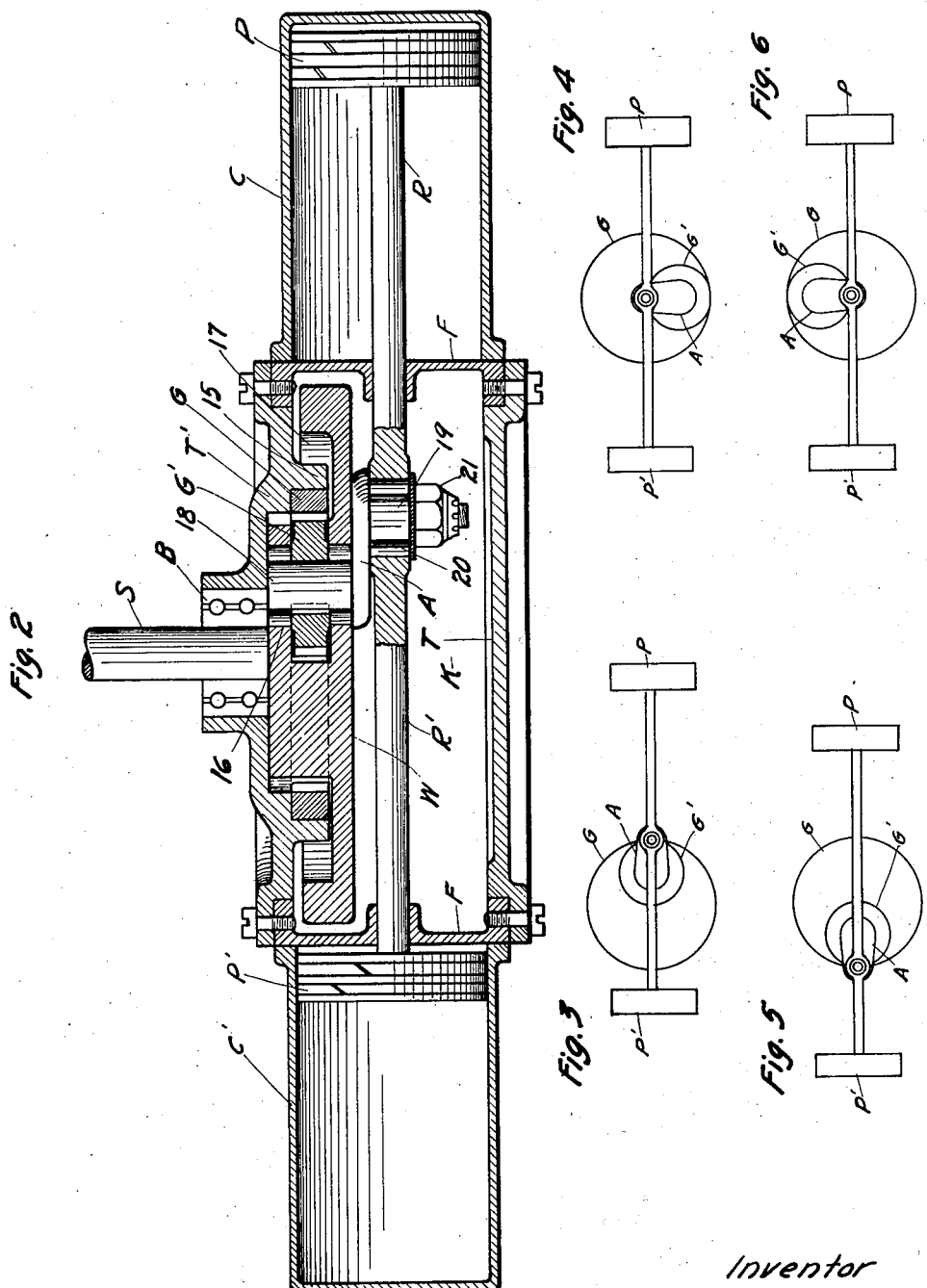

Patented Mar. 30, 1926.

1,579,083

UNITED STATES PATENT OFFICE.

WALTER G. COLLINS, OF GLENDALE, CALIFORNIA.

MECHANICAL MOVEMENT.

Application filed March 24, 1922, Serial No. 546,298. Renewed September 10, 1925.

*To all whom it may concern:*

Be it known that I, WALTER G. COLLINS, a citizen of the United States, residing at Glendale, in the county of Los Angeles and State of California, have invented new and useful Improvements in Mechanical Movements, of which the following is a specification.

My invention relates to mechanical movements, and a purpose of my invention is the provision of a mechanical movement particularly adapted, although not necessarily, to engines for converting the reciprocating motion of pistons into a rotary movement and transferring such movement to a driven shaft and in such manner that all side thrust ordinarily imparted to the piston rods is practically eliminated.

It is also a purpose of my invention to provide a mechanical movement for engines of extremely simple, durable, and efficient construction and which permits of the rigid connection of the piston rods with the piston heads thereby eliminating the necessity and disadvantages of employing wrist pins.

Although I will describe only one form of mechanical movement embodying my invention and point out the novel features thereof in a claim, it is to be understood that various changes and modifications may be made herein without departing from the spirit and scope of such claim.

In the accompanying drawings,

Fig. 2 is a longitudinal sectional view taken on the line 2—2 of Fig. 1.

Figs. 3, 4, 5 and 6 are diagrammatic views illustrating the various positions which the mechanical movement occupies during one complete cycle.

Similar reference characters refer to similar parts in each of the several views.

Figure 1:
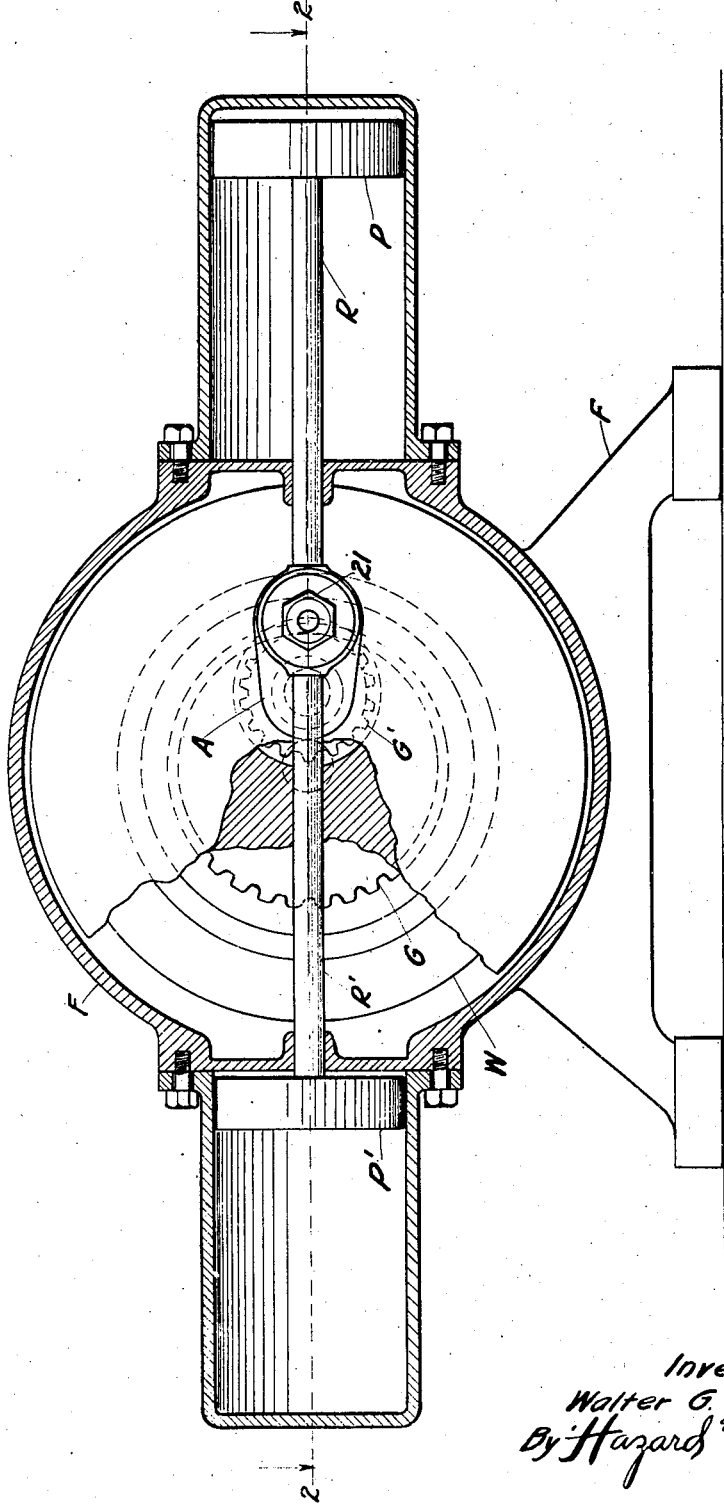
Figure 1 is a view showing in side elevation and partly in section one form of mechanical movement in applied position with respect to an engine.

Referring specifically to the drawings, my invention in its present embodiment is shown as applied to an engine consisting of opposed cylinders C and C' sustained on a frame designated at F and arranged in horizontal alinement, each cylinder containing a piston P or P' including a rod R or R' which is movable through the inner end of the cylinder. These rods R and R' are formed from a single length of metal so that it may be said that the pistons P and P' are provided with a common piston rod. The frame F includes a centrally disposed compartment K provided with open sides which are normally closed by plates T and T', the former being provided axially with a bearing B in which a drive shaft S is journaled. The inner side of the plate T is provided with an annular collar 15 to which is fixedly secured an internal ring gear G, the teeth of which are adapted to constantly mesh with a pinion or relatively small gear G' rotatably mounted in a suitable recess 16 formed in a fly wheel W. The fly wheel W is secured axially to the shaft S and is recessed as indicated at 17 to accommodate the ring gear G and the collar 15.

The pinion G' is keyed to a crank pin 18, the latter being mounted eccentrically within the fly wheel and constituting part of a conventional form of crank A employed for operatively connecting the piston to the piston rods R and R'. As clearly shown in Fig. 2, the crank also includes a pin 19 which extends through a suitable bearing 20 formed in the piston rods R and R', a nut 21 being threadedly mounted on the pin for securing the crank against displacement from the bearing.

By reference to Figs. 3, 4, 5 and 6, it will be seen that in operation the reciprocating movement of the pistons P and P' moves the crank pin 19 in the same plane as the rods, and under this movement rotation of the pin 18 is effected to impart owing to its eccentric mounting with respect to the fly wheel W, a similar movement to the pinion G' and about the shaft S as a center. As the pinion is capable of rotation about its own axis and is in mesh with the ring gear G, it will be clear that its rotational movement will effect rotation of the fly wheel W and with the latter the driving shaft S.

From the foregoing operation it will be manifest that practically all side thrust imparted to the piston rods R and R' is eliminated and therefore the rigid connection of the rods with the pistons is rendered possible and with it the elimination of the usual wrist pins. The ring gear G tends to absorb any detrimental lateral thrust of the crank A, while at the same time insuring of the positive and unrestricted operation of the pinion G' in allowing of the crank A effecting rotation of the fly wheel W.

What I claim is:

In combination, a frame having open sides, plates closing the open sides, an annular collar formed on one of the inner sides of the plates, an internal ring gear secured to the collar, a shaft journaled in the collared plate, a fly-wheel fixed to the shaft and disposed within the frame, a pinion journaled eccentrically in the fly-wheel and within the area defined by the ring gear, cylinders fixed to the frame, pistons including rods movable through the frame, and a crank for operatively connecting the piston rods with said pinion.

In testimony whereof I have signed my name to this specification.

W. G. COLLINS.